(12) United States Patent
Newell (10) Patent No.: US 8,468,566 B2
(45) Date of Patent: Jun. 18, 2013

(54) CONTROL MESSAGE FEEDBACK IN A SATELLITE BROADCAST COMMUNICATION SYSTEM

(75) Inventor: Nicholas Brandon Newell, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1074 days.

(21) Appl. No.: 12/422,068

(22) Filed: Apr. 10, 2009

(65) Prior Publication Data

US 2010/0263000 A1    Oct. 14, 2010

(51) Int. Cl.
*H04N 7/20*    (2006.01)

(52) U.S. Cl.
USPC ............... 725/65; 725/63; 725/64; 725/66

(58) Field of Classification Search
None
See application file for complete search history.

(56) References Cited

U.S. PATENT DOCUMENTS

| | | | | |
|---|---|---|---|---|
| 6,157,719 | A * | 12/2000 | Wasilewski et al. | 380/210 |
| 6,772,434 | B1 * | 8/2004 | Godwin | 725/68 |
| 7,039,614 | B1 * | 5/2006 | Candelore | 705/57 |
| 7,207,054 | B1 * | 4/2007 | Richards et al. | 725/72 |
| 7,266,198 | B2 * | 9/2007 | Medvinsky | 380/200 |
| 7,461,396 | B2 * | 12/2008 | Brown et al. | 726/2 |
| 7,930,712 | B1 * | 4/2011 | Joseph et al. | 725/31 |
| 8,081,609 | B2 * | 12/2011 | Balachandran et al. | 370/338 |
| 2003/0088873 | A1 * | 5/2003 | McCoy et al. | 725/63 |
| 2005/0223410 | A1 * | 10/2005 | Li et al. | 725/135 |
| 2005/0273822 | A1 * | 12/2005 | Snell et al. | 725/64 |
| 2006/0136291 | A1 * | 6/2006 | Morita et al. | 705/13 |
| 2008/0019307 | A1 * | 1/2008 | Tenny et al. | 370/329 |
| 2009/0168812 | A1 * | 7/2009 | Crookes et al. | 370/537 |
| 2009/0252227 | A1 * | 10/2009 | NepomucenoLeung et al. | 375/240.13 |

* cited by examiner

*Primary Examiner* — Brian Pendleton
*Assistant Examiner* — Jonathan V Lewis
(74) *Attorney, Agent, or Firm* — Kilpatrick Townsend & Stockton LLP (57) ABSTRACT

A method of communicating control information in a satellite broadcast communication system is presented. In the method, at least one copy of a control message set is transmitted from a control system by way of a satellite to a broadcast receiver. The control message set includes at least one control message. At least one copy of each of the control messages of the control message set is received at the broadcast receiver. A feedback message is transmitted from the broadcast receiver by way of a terrestrial communication link to the control system. The feedback message includes an indication that all of control messages of the control message set were received at the broadcast receiver. The feedback message is received at the control system. In response to receiving the feedback message, transmission of subsequent copies of the control message set is terminated at the control system.

16 Claims, 8 Drawing Sheets

CONTROL MESSAGE FEEDBACK IN A SATELLITE BROADCAST COMMUNICATION SYSTEM

BACKGROUND

A popular way of accessing television programming is by way of a satellite broadcast receiver and small attached dish antenna designed to receive television video and audio data received from a satellite uplink center by way of an orbiting satellite. By accessing such a system, a subscriber to a satellite broadcast service provider may receive any of several hundred programming channels providing news, sports, entertainment, and the like for live program viewing, or for recording of programs for subsequent playback at a time more convenient for the subscriber.

Oftentimes, a satellite broadcast receiver provides an additional communication connection, such as a telephone line connection, thus allowing the subscriber to request programming services, such as special events and video-on-demand (VOD) or pay-per-view (PPV) programs, by way of the broadcast receiver. This additional communication connection thus allows the subscriber to contact the satellite uplink center. Such communication is generally not possible by way of the satellite connection, as the broadcast receiver and associated antenna are not designed to transmit information back to the uplink center via satellite.

In addition to delivering broadcast programming, a satellite broadcast service provider may also employ the satellite uplink center and satellite to send control information to the broadcast receiver. Such control information may include, for example, authorization and deauthorization information regarding which, if any, of the programming channels the broadcast receiver is to be configured to receive and present to the subscriber. Such information may be based on the level of service for which the subscriber pays. However, the broadcast receiver may not receive some portion of the information from time to time due to various circumstances, such as poor atmospheric conditions or the receiver being powered down during the transmission of the control information. As a result, the uplink center may transmit this information multiple times by way of the satellite to the broadcast receiver over a number of hours to help ensure that the information is ultimately received at the broadcast receiver.

SUMMARY

A method of communicating control information in a satellite broadcast communication system, the method comprising: transmitting at least one copy of a control message set from a control system by way of a satellite to a broadcast receiver, wherein the control message set comprises at least one control message; receiving at least one copy of each of the control messages of the control message set at the broadcast receiver; transmitting a feedback message from the broadcast receiver by way of a terrestrial communication link to the control system, wherein the feedback message comprises an indication that all of the control messages of the control message set were received at the broadcast receiver; receiving the feedback message at the control system; and terminating transmission of subsequent copies of the control message set at the control system in response to receiving the feedback message.

The control message set comprises a single control message comprising an identifier for the single control message.

The indication in the feedback message comprises the identifier for the single control message.

The control message set comprises multiple control messages, wherein each of the control messages comprises an identifier for the associated control message and an indication of the other control messages of the control message set.

The method further comprising: transmitting at least one copy of a second control message set from the control system by way of the satellite to the broadcast receiver, wherein the second control message set comprises multiple control messages; receiving less than all of the multiple control messages of the second control message set at the broadcast receiver within a predetermined time period of receiving at least one of the multiple control messages of the second control message set; transmitting a second feedback message from the broadcast receiver by way of the terrestrial communication link to the control system, wherein the feedback message comprises an indication of those of the multiple control messages of the second control message set not received at the broadcast receiver; receiving the second feedback message at the control system; and transmitting at least one copy of at least those of the multiple control messages of the second control message set not received at the broadcast receiver from the control system by way of the satellite to the broadcast receiver in response to receiving the second feedback message.

The method further comprising: terminating transmission of subsequent copies of those of the multiple control messages of the second control message set received at the broadcast receiver from the control system by way of the satellite in response to receiving the second feedback message.

Transmitting the at least one copy of the control message set comprises transmitting each copy according to a predetermined transmission schedule; the feedback message comprises at least one timestamp indicating when each of the control messages of the control message set was received at the broadcast receiver; and the method further comprises modifying the predetermined transmission schedule based on the at least one timestamp.

The feedback message comprises at least one timestamp indicating when each of the control messages of the control message set was received at the broadcast receiver; and the method further comprises generating metrics based on the at least one timestamp, wherein the metrics indicate communication performance between the control system and the broadcast receiver.

The method further comprising: transmitting at least one copy of a second control message set from the control system by way of the satellite to the broadcast receiver, wherein the second control message set comprises at least one control message; and generating an error condition in the control system if a second feedback message associated with the second control message set is not received at the control system within a predetermined period of time of the transmission of the at least one copy of the second control message set.

The control message set comprises information for controlling access by the broadcast receiver to broadcast communications transmitted by way of the satellite.

A control system for a satellite broadcast communication system, the control system comprising: a satellite communication interface configured to transmit control messages to broadcast receivers by way of a satellite, wherein each of the control messages comprises an identifier for one of the broadcast receivers intended to receive the control message; a terrestrial communication interface configured to receive feedback messages from the broadcast receivers, wherein each of the feedback messages is associated with at least one of the control messages; and control circuitry configured to: generate a control message set comprising at least one control message intended for one of the broadcast receivers; transmit at least one copy of the control message set by way of the satellite communication interface to the broadcast receiver; receive a feedback message associated with the control message set from the one of the broadcast receivers by way of the terrestrial communication interface, wherein the feedback message indicates that all of the control messages of the control message set were received at the broadcast receiver; and terminate transmission of subsequent copies of the control message set in response to receiving the feedback message.

The control circuitry is further configured to encrypt each of the control messages of the control message set before transmitting the control messages of the control message set by way of the satellite communication interface to the one of the broadcast receivers.

The control message set comprises multiple control messages, wherein each of the control messages of the control message set comprises an identifier for the control message and an indication of the other control messages of the control message set.

The control system further comprising: data storage; wherein feedback message comprises a first timestamp set indicating when each of the control messages of the control message set was received at the broadcast receiver; and wherein the control circuitry is further configured to store the first timestamp set from the feedback message, to store a second timestamp set indicating when each of the control messages of the control message set was transmitted, and to generate metrics based on the first timestamp set and the second timestamp set to indicate communication performance between the control system and the broadcast receiver.

The control circuitry is configured to: transmit at least one copy of a second control message set by way of the satellite communication interface to the one of the broadcast receivers, wherein the second control message set comprises at least one control message; and generate an error condition if a feedback message associated with the second control message set is not received by way of the terrestrial communication interface within a predetermined time period of the transmission of the at least one copy of the second control message set.

A broadcast receiver for a satellite broadcast communication system, the broadcast receiver comprising: a satellite communication interface configured to receive control messages from a control system by way of a satellite; a terrestrial communication interface configured to transmit feedback messages to the control system; and control circuitry configured to: receive a control message set comprising at least one control message; generate a feedback message associated with the control message set indicating that all of the control messages of the control message set were received; and transmit the feedback message by way of the terrestrial communication interface to the control system.

Each of the control messages of the control message set indicates that the broadcast receiver is the intended destination of the control message set; and the control circuitry is configured to verify that each of the control messages of the control message set is intended for the broadcast receiver prior to transmitting the feedback message associated with the control message set by way of the terrestrial communication interface to the control system.

The control circuitry is configured to: receive a first of a plurality of control messages of a second control message set from the control system by way of the satellite communication interface; generate a feedback message associated with the second control message set within a predetermined period of time after the first of the control messages of the second control message set was received, wherein the feedback message indicates those of the control messages of the second control message set that have been received by way of the satellite communication interface.

The control circuitry is configured to: generate a second feedback message associated with the second control message set when all of the control messages of the second control message set are received by way of the satellite communication interface, wherein the second feedback message associated with the second control message set indicates that all of the control messages of the second control message set have been received.

The control circuitry comprises a removable circuit card installed into an externally-accessible connector of the broadcast receiver.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
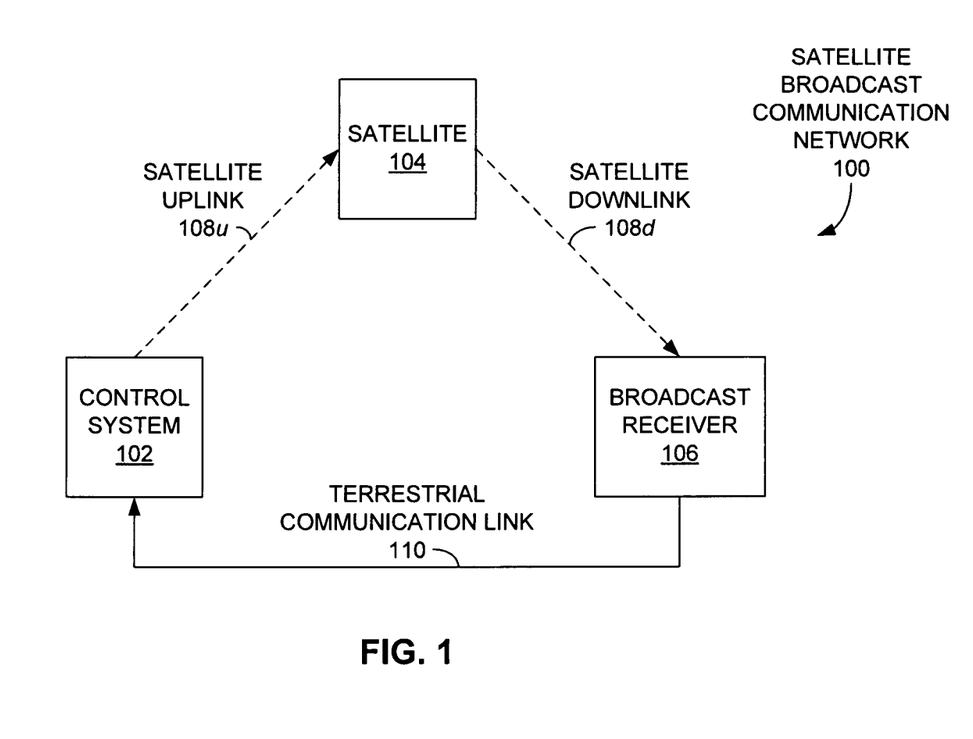
FIG. 1 is a simplified block diagram of a satellite broadcast communication system according to an embodiment of the invention.

FIG. 1 is a simplified block diagram of a satellite broadcast communication system 100 including a control system 102, a satellite 104, and a broadcast receiver 106. Other components normally associated with such a system, including additional satellites, broadcast receivers, routers, switches, transmitter and receiver circuits, and the like, are not illustrated in FIG. 1 to simplify the following discussion. In one example, the satellite broadcast communication system 100 provides audio and/or video programming via at least one satellite 104 to any number of broadcast receivers 106, such as satellite set-top boxes (STBs).

The control system 102 communicates with the satellite 104 by way of a satellite uplink 108$u$, while the satellite 104 communicates with the broadcast receiver 106 by way of a satellite downlink 108$d$. The satellite uplink 108$u$ and downlink 108$d$ provide a communication path over which the control system 102 may forward audio and/or video programming over a plurality of programming channels to the broadcast receiver 106. These same links 108 may also be utilized to carry control messages, which include information not included in the programming being transferred from the control system 102 to the broadcast receiver 106.

Facilitating the transmission of information from the broadcast receiver 106 to the control system 102 is a terrestrial communication link 110, such as a telephone connection or Internet connection. While the terrestrial communication link 110 may allow a subscriber associated with the broadcast receiver 106 to order programming services, such as live events, VOD programs, and PPV events, from the control system 102, this same link 110 may be employed in various systems described herein to provide feedback information regarding the control messages being transmitted over the satellite links 108 to the broadcast receiver 106.

Figure 2:
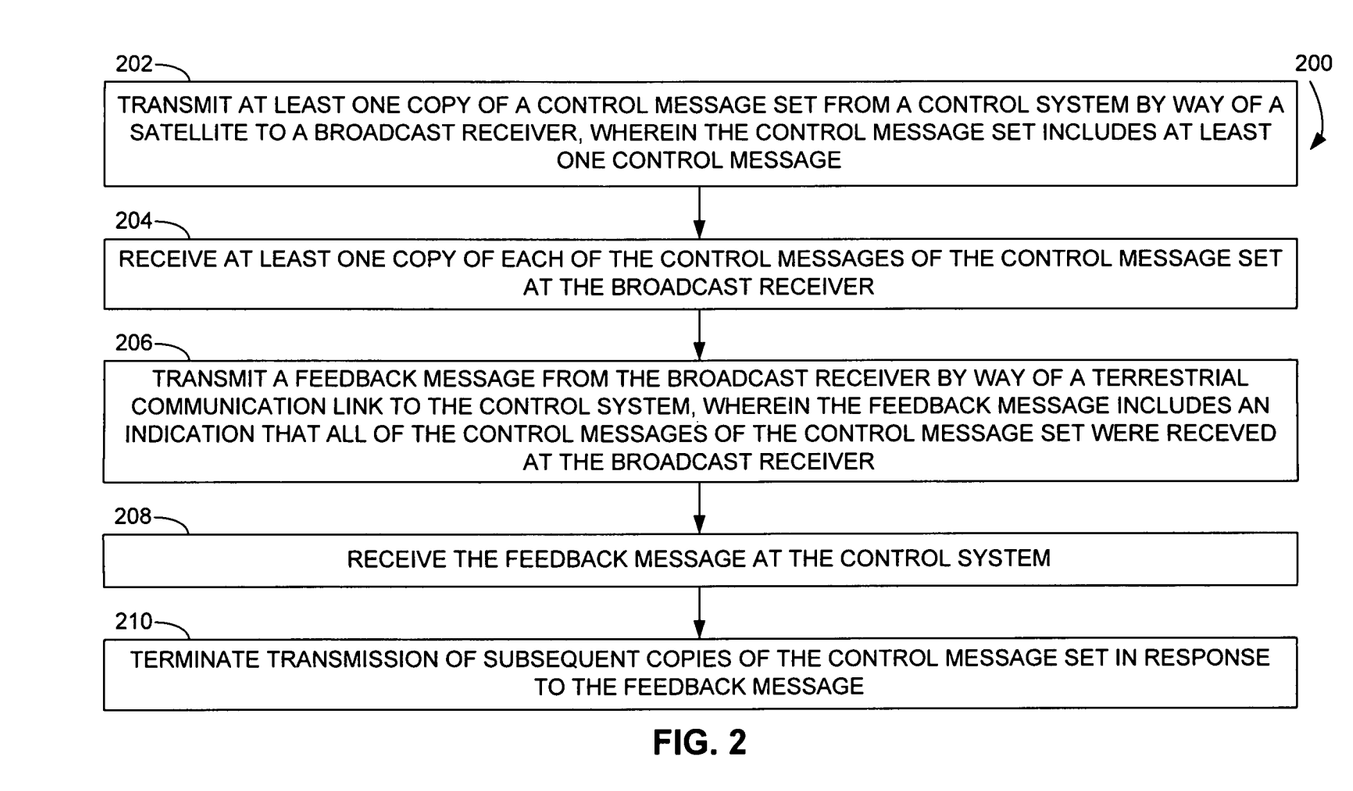
FIG. 2 is a flow diagram of a method according to an embodiment of the invention for communicating control information in the satellite broadcast communication system of FIG. 1.

FIG. 2 provides a flow diagram of a method 200 according to an embodiment of the invention for communicating control information in the satellite broadcast communication system 100 of FIG. 1. However, other satellite-based communication systems other than the specific system 100 of FIG. 1 may employ the method 200 of FIG. 2 to similar effect.

In the method 200, at least one copy of a control message set is transmitted from the control system 102 by way of the satellite 104 and associated links 108 to the broadcast receiver 106 (operation 202). The control message set includes at least one control message. At least one copy of each of the control messages of the control message set is received at the broadcast receiver 106 (operation 204). A feedback message is then transmitted from the broadcast receiver 106 by way of the terrestrial communication link 110 to the control system 102 (operation 206). The feedback message includes an indication that all of the control messages of the control message set were received at the broadcast receiver 106. After receiving the feedback message (operation 208), the control system 102 terminates transmission of subsequent copies of the control message set (operation 210). In another embodiment, a computer-readable storage medium may have encoded thereon instructions for a processor or other control circuitry to direct a device to implement the method 200.

As a result, use of the method 200 employs a previously-existing terrestrial communication link 110 for transmitting feedback messages regarding the control messages sent from the control system 102 over the satellite links 108 to the broadcast receiver 106. This feedback may thus allow, at a minimum, a reduction in the number of times a particular control message set is transmitted to ensure receipt at the intended broadcast receiver 106, thus reducing the amount of bandwidth consumed by transfer of the control messages over the satellite links 108.

Figure 3:
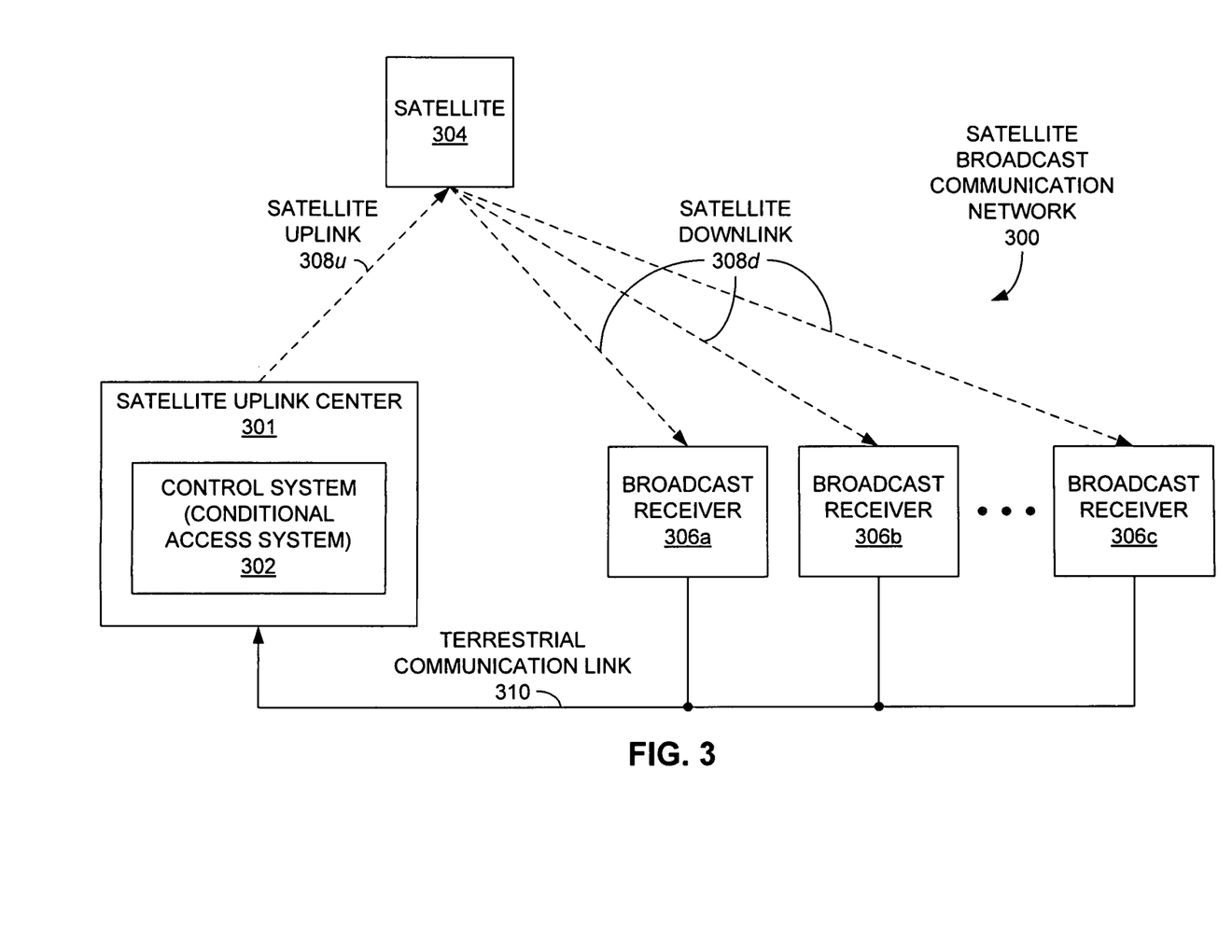
FIG. 3 is a block diagram of a satellite broadcast communication system according to another embodiment of the invention.

FIG. 3 is a block diagram of a satellite broadcast communication system 300 according to another embodiment of the invention. The system 300 includes a satellite uplink center 301, a satellite 304, and multiple broadcast receivers 306$a$, 306$b$, 306$c$. While only three broadcast receivers 306 are explicitly shown, thousands or millions of the receivers 306 may exist within the system 300. Similarly, while a single satellite 304 is depicted in FIG. 3, multiple such satellites 304 may be employed in other implementations of the satellite broadcast communication system 300.

The satellite uplink center 301 is configured to transmit audio and/or video programming, as well as control information related to the operation of the communication system 300, over a satellite uplink 308$u$ to the satellite 304. The satellite uplink 308$u$ may include one or more communication channels for carrying the information from the uplink center 301 to the satellite 304. In FIG. 3, the satellite uplink center 301 may receive the audio/video programming in the form of separate broadcast channels, such as major broadcast network channels, sports and/or entertainment channels, and so forth, from remote programming sources (not shown in FIG. 3). In other implementations, at least one of the channels may originate within the uplink center 301.

Included in the satellite uplink center 301 is a conditional access system (CAS) 302, which may serve as a control system 302, such as the control system 102 of FIG. 1. The control system 302 is configured to transmit control information in the form of control messages over the satellite uplink 308$u$. In one embodiment, the control messages may be transmitted over one of the same channels of the uplink 308$u$ as the audio/video programming, while in other arrangements, the control messages may be carried over a separate channel. The control messages and the information carried therein are described in greater detail below.

The satellite 304 may include one or more transponders, each of which may receive one or more of the uplink 308$u$ channels received from the uplink center 301 and retransmit or redirect such channels over a satellite downlink 308$d$ to the multiple broadcast receivers 306. In one embodiment, the satellite 304 occupies a geosynchronous orbit so that the apparent location of the satellite 304 as viewed from the ground is relatively stationary, thus allowing antennas (not shown in FIG. 3) associated with the broadcast receivers 306 to be mounted in a fixed orientation.

Each of the broadcast receivers 306, such as television set-top boxes (STBs), are configured to receive the broadcast audio/video programming and control information transmitted over the satellite downlink 308$u$ channels from the satellite 304, and process the programming and control information. For example, the audio/video programming may be processed and forwarded to an output device, such as a television, video monitor, or audio/video receiver (not depicted in FIG. 3), stored on a digital video recorder (DVR) residing within or connected to the broadcast receiver 306, or processed in another manner. Similarly, the control information may be processed to alter or otherwise control the operation of the broadcast receiver 306. More details concerning the control information are presented hereinafter.

Each of the broadcast receivers 306 may also be coupled with the control system 302 by way of a terrestrial communication link 310. The terrestrial link 310 may be implemented as a telephone connection over a public switched telephone network (PSTN), a wireless telephone network, or other telephone means. In another example, the terrestrial communication link 310 may be a type of wide area network (WAN), such as the Internet. In other embodiments, the terrestrial link 310 may be any type of communication network capable of transporting control and/or status information from each of the broadcast receivers 306 to the conditional access system 302, and may include any number of switches, routers, and other network components. The information carried over the terrestrial link 310 may include requests for service, such as video-on-demand (VOD) and special event orders. In examples more fully described below, information transmitted over the terrestrial link 310 include feedback messages relating to control messages transmitted over the satellite links 308 from the control system 302 to the broadcast receivers 306.

Figure 4:
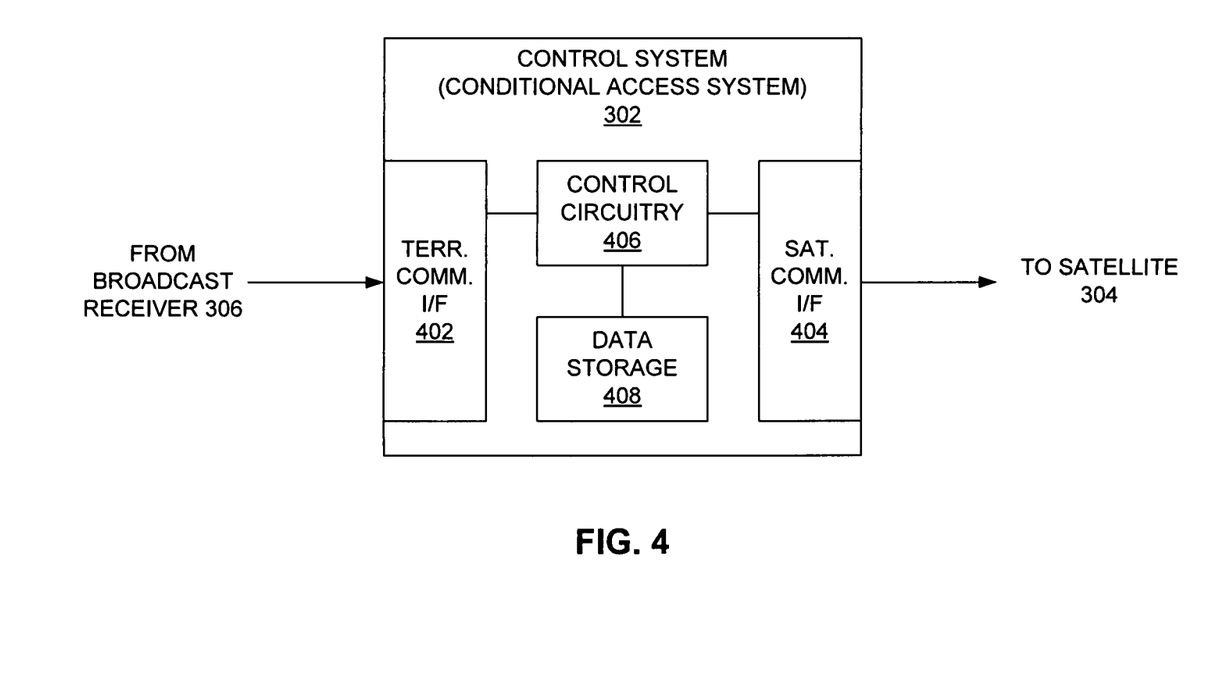
FIG. 4 is a block diagram of a control system of the satellite broadcast communication system of FIG. 3 according to an embodiment of the invention.

FIG. 4 is a block diagram of the control system (e.g., the conditional access system) 302 of FIG. 3 according to one embodiment. The control system 302 includes a terrestrial communication interface 402, a satellite communication interface 404, control circuitry 406, and data storage 408. Other components not specifically depicted in FIG. 4 may also be incorporated in the control system 302 in further implementations.

The terrestrial communication interface 402 is configured to receive feedback and other control and/or status information over the terrestrial communication link 110. Depending on the implementation, the terrestrial communication interface 402 may be any wired or wireless interface, such as a telephone connection, a wide area network (WAN) connection, a wired or wireless local area network (LAN) connection coupled with a WAN, and the like.

The satellite communication interface 404 of FIG. 4 is configured to transmit the control messages mentioned above by way of the satellite uplink 308$u$ to the satellite 304 for ultimate transmission to one or more of the broadcast receivers 306. In one example, the satellite communication interface 404 is configured to transfer the control messages to another component or set of components (not illustrated in FIG. 3 or 4) of the satellite uplink center 301, which in turn allocates the control messages and audio/video programming among the channels of the satellite uplink 308$u$ and performs the actual transmission. In another implementation, the satellite communication interface 404 performs the allocation and transmission of the control messages and audio/video programming.

The control circuitry 406 is configured to control and interact with the terrestrial communication interface 402 and the satellite communication interface 404. For example, the control circuitry 406 is configured to generate the control messages, as well as receive and process the feedback messages, as mentioned above. This functionality regarding the generation and processing of the control and feedback messages is described in greater detail hereinafter. The control circuitry 406 may include one or more processors, such as a microprocessor, microcontroller, or digital signal processor (DSP), configured to execute instructions directing the processor to perform the functions and facilitate the communication discussed in greater detail below. The control circuitry 406 may also include memory or data storage adapted to contain such instructions. In another implementation, the control circuitry 406 may be strictly hardware-based logic, or may include a combination of hardware, firmware, and/or software elements.

Also possibly included the control system 302 is data storage 408 configured to store information regarding the transmission and reception of the control messages that the control system 302 transmits over the satellite links 308 by way of the satellite 304 to the broadcast receivers 306. This information is described more fully below. The data storage 408 may include any type of data storage medium, including solid state memory, such as static and/or dynamic random access memory (RAM) or flash memory; direct access memory, such as magnetic and optical disk drives; and sequential access memory, such as tape memory.

Figure 5:
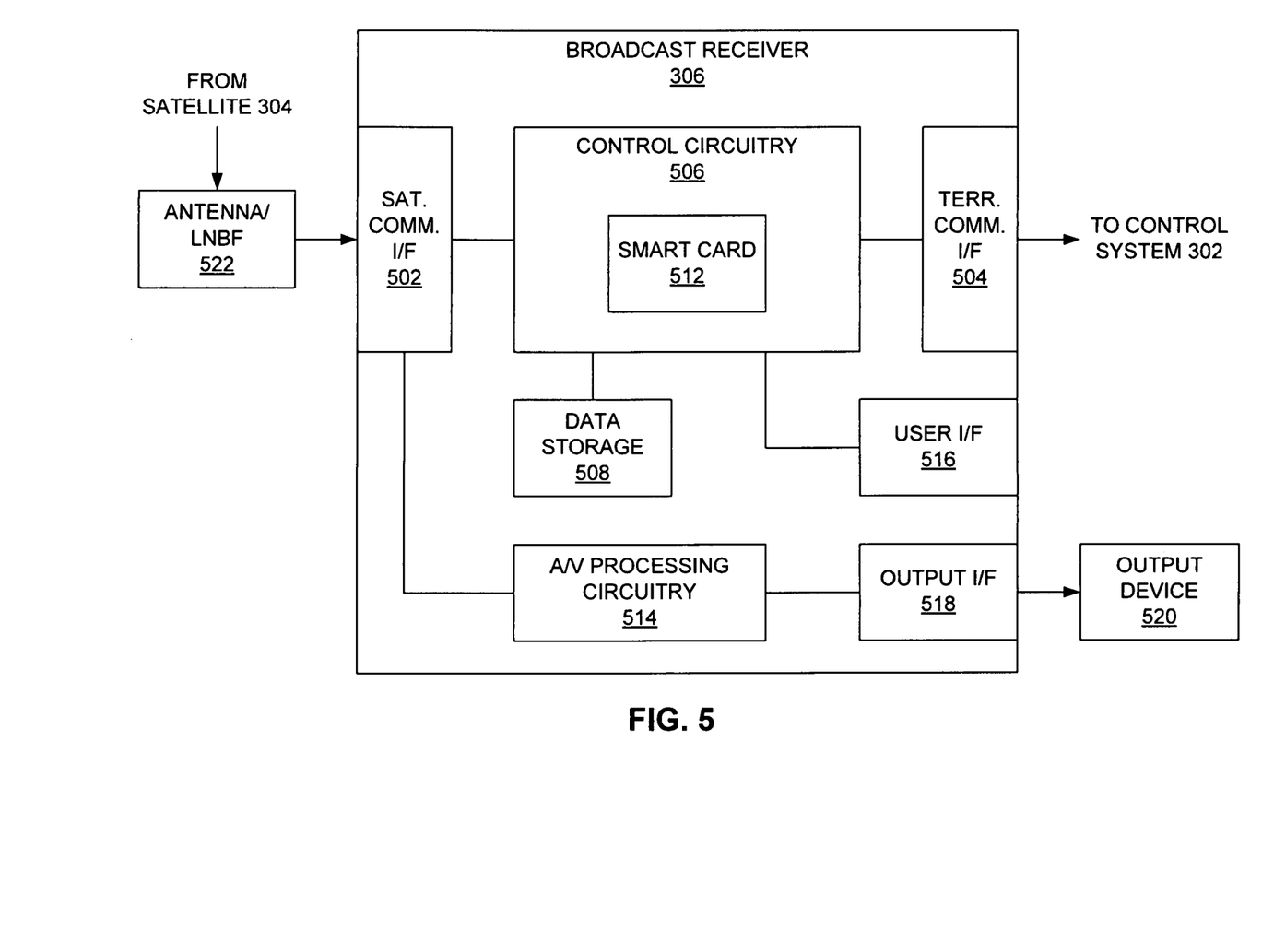
FIG. 5 is a block diagram of a broadcast receiver of the satellite broadcast communication system of FIG. 3 according to an embodiment of the invention.

FIG. 5 is a block diagram of the broadcast receiver 306 of FIG. 3 according to one implementation, which includes a satellite communication interface 502, a terrestrial communication interface 504, and control circuitry 506 to perform the various functions regarding generation and processing of control and feedback message. More specifically, the satellite communication interface 502 receives the control messages sent by the control system 302 by way of the satellite 304 over the satellite links 308, as well as audio/video programming transmitted over the same communication path. In FIG. 5, the satellite communication interface 502 receives the channels of the satellite downlink 308$u$ by way of a hyperboloid antenna 522 combined with a low-noise block-converter/ feedhorn (LNBF), which collects and amplifies the incoming signals of the downlink 308$u$, down-converts the signals from microwave frequencies to intermediate frequencies, and forwards the signals to the satellite communication interface 502. While the above construction is particularly well-suited for satellite broadcast television communications, other methods of receiving satellite signals may be employed in other arrangements. In other implementations, the antenna/ LNBF combination 522 may be considered part of the satellite communication interface 502.

The terrestrial communication interface 504 of the broadcast receiver 306 is configured to transmit service requests and other communication regarding the operation of the receiver 306 from the receiver 306 over the terrestrial communication link 310. In one instance, the terrestrial communication interface 504 may include a connector and associated circuitry for transmitting information over a household telephone connection. In another example, the terrestrial communication interface 504 may include a wired or wireless interface for coupling the receiver 306 with a cable or digital subscriber line (DSL) gateway, or for communicating with a LAN router coupled to such a gateway for communicating over a WAN, such as the Internet, as discussed above. Other implementations may implement one or more interfaces for different types of terrestrial communication links 310 aside those described herein.

The control circuitry 506 is configured to process control messages received via the satellite communication interface 502, as well as generate feedback messages associated with those control messages for transmission via the terrestrial communication interface 504. As with the control circuitry 406 of the control system 302 of FIG. 4, the control circuitry 506 may include one or more processors, such as a microprocessor, microcontroller, or DSP, configured to execute instructions directing the processor to perform the functions and facilitate the communication involving the control and feedback messages mentioned above. The control circuitry 506 may also include memory or data storage adapted to contain such instructions. In another embodiment, the control circuitry 506 may be hardware-based logic, or may include a combination of hardware, firmware, and/or software components.

Also depicted in FIG. 5 is data storage 508 employable by the control circuitry 506 to store data related to the received control messages and transmitted feedback messages involving the broadcast receiver 306. More discussion involving the information stored in the data storage 508 is provided below. The data storage 508 may take any form of storage media, such as DRAM, SRAM, flash memory, magnetic disk, optical disk, and so forth.

In FIG. 5, the broadcast receiver 306 operates primarily as a television set-top box 306 for delivering audio and/or video programming to an output device 520, such as a television, video monitor, or audio/video receiver. To that end, the broadcast receiver 306 in the embodiment of FIG. 5 also includes audio/video processing circuitry 514, an output interface 518, and a user interface 516, each of which may be controlled by the control circuitry 506. The audio/video processing circuitry 514 may process the audio/video programming received by way of the satellite communication interface 502, such as by way of programming channel selection, decryption, decoding, and the like. In one embodiment, the audio/video programming is formatted according to one of the packet-based standards of the Motion Picture Experts Group (MPEG), such as MPEG-2 or MPEG-4, although other audio/video formats may be utilized in other implementations of the broadcast receiver 306.

The output interface 518 is configured to deliver the selected audio/video programming to the output device 520 in a format usable by that device 520. For example, the video portion of the selected programming may be delivered by way of a modulated video cable connection, a composite or component video RCA-style (Radio Corporation of America) connection, and a Digital Video Interface (DVI) or High-Definition Multimedia Interface (HDMI) connection. The audio portion may be transported over a monaural or stereo audio RCA-style connection, or over an HDMI connection. Other audio/video formats and related connections may be employed in other embodiments.

The user interface 516 may provide either or both of a control panel connection provided directly on the receiver 506, and a remote control interface. The remote control interface may receive commands from a remote control device (not illustrated in FIG. 5) by way of commands transmitted over a radio frequency (RF) or infrared (IR) frequency band. Different communication methods, such as those employing optical or acoustic transmission of remote commands, may be used in other implementations.

Each of these components may also be controlled by, or interact with, the control circuitry 506 to allow a subscriber or user to view and/or record audio/video programming of interest by way of the user interface 516. Other components not explicitly discussed herein, such as an embedded DVR, may also be incorporated into the broadcast receiver 306 while still remaining within the scope of the invention as described herein.

In one implementation of the receiver 306, the control circuitry 506 may include a removable circuit card, often referred to as a "smart card" 512. The smart card 512 may contain circuitry for maintaining information regarding the specific audio/video services for which a subscriber is authorized to access. For example, the smart card 512 may contain cryptographic keys or similar information for those services to which a user has subscribed. The control logic 506 may use such keys to decrypt or descramble certain programming channels, such as premium movie channels, sport-specific subscription packages, and the like. The smart card 512 may also include other types of information regarding the operation of the receiver 306. Also stored in the smart card 512 may be an address or other identifier associated with the receiver 306 and/or subscriber so that control messages transmitted over the satellite link 306 may be received and decoded by the specific receiver 306 intended as the destination of the control message. In one arrangement, the smart card 512 is installed in an externally-accessible connector of the receiver 306, thus allowing the subscriber to install or replace the card 512.

The control system 302 of FIG. 3 is primarily responsible for transmitting much of the information stored in or received by the smart card 512 by way of the satellite 304 and corresponding communication links 308 in the form of the control messages mentioned above. The control messages may include many different kinds of control or status information related to the operation of the broadcast receiver 306, such as the channel authorization or decryption information noted above. Other types of control message information may include disconnection of the receiver 306 from the system 300, thus terminating access by the receiver 306 to any programming or other information on the system 300. Another type of control message information may be a zip code or other geographical designation associated with the receiver 306, so that that region-specific information may be directed to only those receivers 306 associated with that region. One control message may be a "pairing" message that logically associates the smart card 512 with the receiver or STB 306 in which the smart card 512 is installed, thus allowing control messages to be directed to the receiver 306 by way of an address of its installed smart card 512. Other control messages, such as those delivering text messages from the programming service provider to the subscriber, credit information of the subscriber for the purchase of per-per-view (PPV) programs, and other data, may also be utilized. As a result, the control system 302 may initiate many control and status functions involving the broadcast receivers 306 remotely by way of the satellite 304.

The control system 302 may transmit many such control messages over the satellite 304 and corresponding links 308 in numbers commensurate with the number of broadcast receivers 306 coupled with the network 300, possibly resulting in millions of such control messages being transmitted in a single day. In one example, each of the messages are may be encoded such that only the intended destination receiver 306 may properly decode the message based upon a decryption key stored in the smart card 512. In other embodiments, each control message may include an address of the destination smart card 512 or receiver 512.

In some embodiments, specific control/status information to be transmitted to the broadcast receiver 306 may be extensive enough to require the use of more than one control message. As a result, two or more control messages may form a control message set or "chain", whereby the intended receiver 306 must receive all of the messages of the set to implement the function or task indicated in the control message set. As a result, each of the control messages of a set incorporates an identifier or "signature" associated specifically with that message. The identifier may be a series of alphanumeric characters, binary, octal or hexadecimal digits, or other type of data uniquely identifying the corresponding message. Such an identifier may represent a sequence number, a randomly generated set of characters, or another type of value.

Additionally, each of the messages of a control message set includes an indication of the set to which the message belongs. For example, each message of the set may include the signature of each of the other messages in the set. In another implementation, each message may include an identifier for the entire message set, along with a total number of messages in the set. Other methods of identifying each message in the control message set may be utilized in other implementations.

To help ensure that all of the control messages are received at the intended destination receiver 306, the control system 302 may transmit each control message set of one or more messages multiple times. In one embodiment, the control system 302 may transmit a copy of each control message set twenty or more times over a period of several hours or days, depending on the content of the control message set. Further, the timing of each retransmission of the control message may be predetermined according to some retransmission policy or schedule, depending on the data carried in the control message set. In one example, the retransmission timing may be strictly periodic, wherein the control message set is retransmitted once per some set number of minutes or hours. In another example, the frequency of the retransmissions may be altered throughout the retransmission process, such as, for example, retransmitting more frequently at the beginning, and then reducing the frequency as more retransmissions of the set are accomplished.

In one implementation, the control system 302 maintains an internal list of control messages or control message sets currently scheduled for retransmission. Such a list may be stored in the data storage 408 of the control system 302 of FIG. 4. Once the control system 302 completes all scheduled transmissions of the control message set, the control system may then remove that control message set from the list. The list may further note the next retransmission time, the number of retransmissions remaining, and other pertinent information.

Figure 6A:
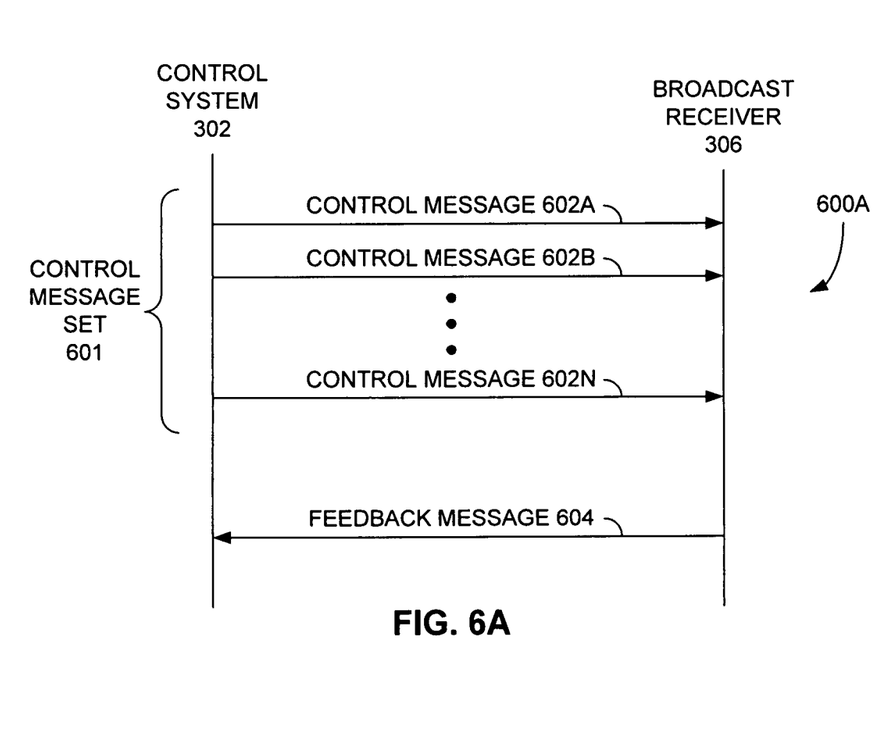
FIG. 6A is a communication diagram of a set of control messages and an associated feedback message between the control system and one of the broadcast receivers of FIG. 3 according to an embodiment of the invention, wherein all of the control messages of the control message set are successfully received at the broadcast receiver.

To reduce the overall number of retransmissions by the control system 302, thus diminishing the amount of bandwidth of the satellite links 308 consumed by the control message transmissions, the broadcast receiver 306 is configured to transmit a feedback message in response to a control message set received at the receiver 306 using the terrestrial communication link 310. FIG. 6A presents a communication diagram 600A illustrating an example in which the control system 302 transmits a control message set 601 comprising multiple control messages 602A, 602B, . . . , 602N to the broadcast receiver 306 over the satellite links 308. While FIG. 6A indicates that more than one control message 602 is received, other control message sets including a single control message may be handled in the same fashion as described below.

Presuming the broadcast receiver 306 receives all of the control messages 602 of the set 601, the broadcast receiver 306 (by way of the control logic 506 and/or smart card 512 incorporated therein) transmits a feedback message 604 to the control system 302 over the terrestrial communication link 310 to indicate that all of the control messages 602 of the set 601 were received successfully. Such indication may include the identifier or signature of each of the control messages 602 of the set 601 discussed above. In response to reception of the feedback message 604, the control system 602 may then prevent future retransmissions of the control message set 601, as such retransmissions would be unnecessary after the successful delivery of the set 601 to the receiver 306. In one example, the control system 302 removes the control messages 602 of the set 601 from a list of control messages to be retransmitted that is maintained by the control system 302. In the case that retransmissions have already been undertaken prior to receipt of the feedback message 604 referring to a previous transmission of the control message set 601, the control system 302 may just prevent future retransmissions at that point.

Figure 6B:
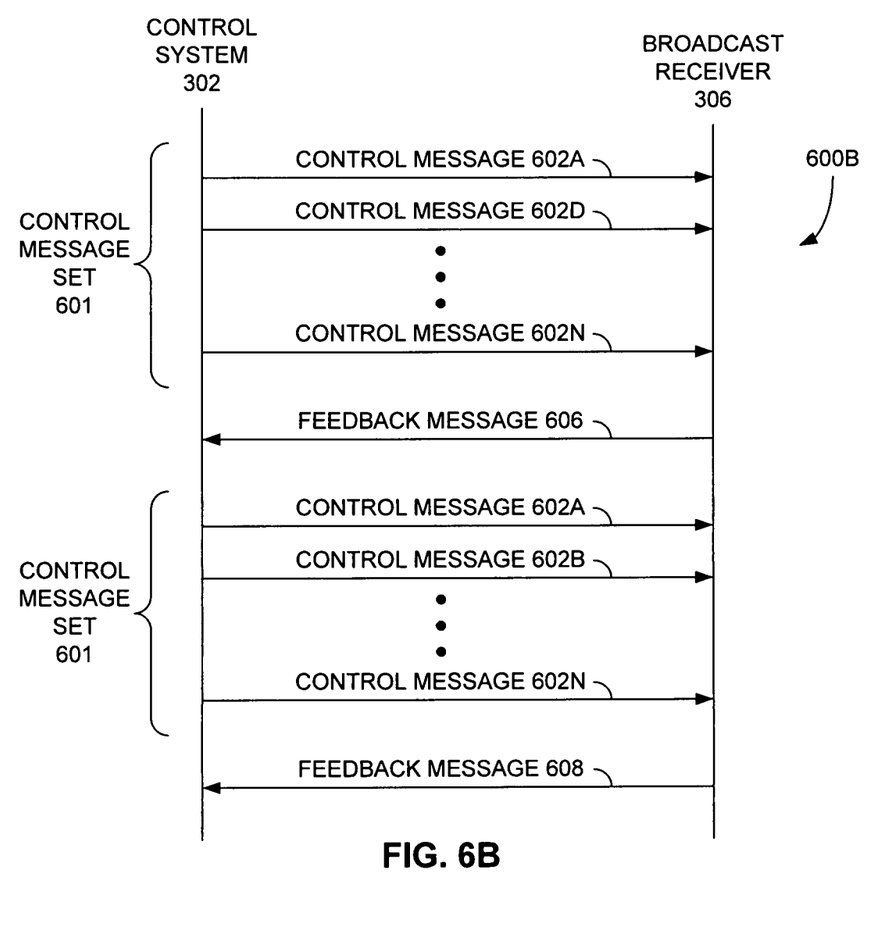
FIG. 6B is a communication diagram of a set of control messages and an associated feedback message between the control system and one of the broadcast receivers of FIG. 3 according to an embodiment of the invention, wherein at least one of the control messages of the control message set is not successfully received initially at the broadcast receiver.

FIG. 6B provides another example in which the broadcast receiver 306 receives less than all of the control messages 602 of the control message set 601 initially transmitted from the control system 302. In this specific example, the second control message 602B and the third control message 602C are transmitted but are not received at the receiver 306. In that case, the receiver 306 may transmit a feedback message 606 indicating those of the control messages 602 (i.e., messages 602A and 602D through 602N) that have been successfully received. In one example, the control circuitry 506 of the receiver 306 generates and causes the transmission of the feedback message 606 after expiration of a predetermined timeout period initiated when the receiver 306 receives the first control message 602 of the control message set 601. The first control message 602 received may not be the first control message 602 (in this case, the control message 602A) transmitted by the control system 302.

As a result of the feedback message 606 indicating that the receiver 306 received less than all of the control messages 602 of the control message set 601, the control system 302 continues to retransmit the control message set 601 according to its predetermined retransmission schedule. As shown in FIG. 6B, all of the control messages 602 of the control message set 601 are retransmitted. In another example, only those control messages 602 not received at the broadcast receiver 306 (i.e., the second control message 602B and the third control message 602C) are retransmitted. Presuming the broadcast receiver 306 receives all outstanding control messages 602B, 602C of the control message set 601, the broadcast receiver 306 then indicates that fact by way of another feedback message 608 transmitted over the terrestrial communication link 310. In one implementation in which all of the control messages 602 of the set 601 are retransmitted, the receiver 306 may indicate once again that all of the messages 602 of the set 601 were received, as opposed to indicating that only the two outstanding messages 602B, 602C were received.

Figure 7:
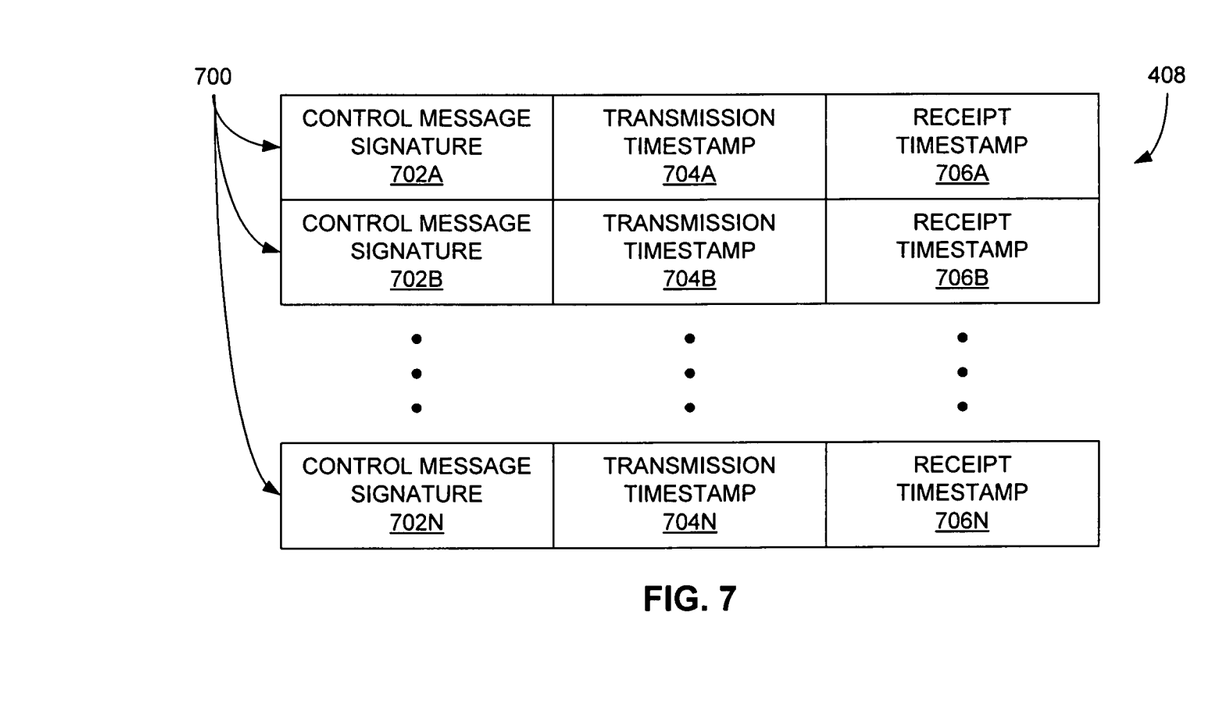
FIG. 7 is a graphical representation of data entries in the data storage of the control system of FIG. 4 associated with the transmission and receipt of control messages according to an embodiment of the invention.

In addition to an indication of the control messages received, each feedback message may include a timestamp indicating when the receiver 306 received each of the indicated control messages, resulting in a first set of stored timestamps. The control system 302 may also maintain a second timestamp set indicating when each of the control messages was transmitted. In one implementation, the control system 302 may store the timestamps in conjunction with the identifier or signature of the related control message in the data storage 408 of the control system 302. FIG. 7 depicts an example of the data storage 408 in which a number of entries 700, one for each control message previously transmitted, is maintained. Each entry 700 represents a control message by way of its signature 702, its transmission timestamp 704 (i.e., the time at which the control system 302 transmitted the message), and its receipt timestamp 706 (i.e., the time at which the target broadcast receiver 306 received the message). In one implementation, each copy of a particular control message may be represented as a separate entry 700 in the data storage 408, in which case each such copy may possess a distinct signature 702, or each copy may have a separate transmission number (not depicted in FIG. 7) associated therewith.

The control system 302 may then use this information in the data storage 408 to monitor, maintain, and/or improve the control message transmission mechanism. In one embodiment, the control system 302 may generate metrics describing the performance of the system 300 by processing the timestamp sets 704, 706. For example, the control system 302 may subtract each transmission timestamp 704 from its corresponding receipt timestamp 706 to determine a total communication time for each control message. The values may then be utilized to generate averages or other metrics concerning the amount of time required for a broadcast receiver 306 to receive a control message set successfully. Such metrics may indicate how the performance of the control message communication mechanism varies based on one or more factors, such as the time of day, week, or month, atmospheric conditions, control message traffic, and other variables. Subsequently, the control system 302 may then alter its retransmission schedule based on those metrics in an attempt to reduce the total number of retransmissions required for successful receipt of the control messages at the receiver 306. Further, the control system 302 or an attached processing device may compile and publish the metrics for review by a system operator or other personnel for subsequent modification of the retransmission schedules.

The metrics may also be employed to issue timely warnings regarding recent decreased performance of the control message transmission scheme. In one example, the control system 302 may issue warnings to a system operator in response to metrics derived from the data in the data storage 408 indicating high numbers of retransmissions, excessively long times between transmission and receipt of the control messages, and other circumstances. The control system 302 may issue such warnings by way of e-mail, short message service (SMS) text messages, phone paging, and other means.

The control system 302 may also issue such a warning if the control system 302 does not receive a feedback message associated with a previously transmitted or retransmitted control message set. More specifically, the control system 302 issues a warning if a feedback message is not received from a target broadcast receiver 306 within a specific period of time of a particular retransmission of a control message set. The warning may provide specific information, such as the identity of the receiver 306 or associated smart card 512, the subscriber, the type of control message, and other information related thereto.

At least some embodiments as described herein for communicating control information in a satellite broadcast communication system may provide a number of advantages. For one, by employing feedback messages over a previously-existing terrestrial communication link to indicate receipt of control/status messages, the control system may greatly reduce the amount of bandwidth of the satellite links consumed by control message traffic, thus increasing the overall amount of bandwidth available for programming channels or other needs. Further, by tracking the amount of time required for a broadcast receiver to receive transmitted or retransmitted control messages, the control system may facilitate advantageous modifications in the transmission/retransmission schedule or policy to further improve control message communication performance. In addition, use of the feedback messages may allow the control system to provide system operators timely warning or fault information regarding the transmission of control information so that such problems may be addressed quickly. Further advantages may be ascertained from the discussion of the embodiments presented above.

While several embodiments of the invention have been discussed herein, other implementations encompassed by the scope of the invention are possible. For example, while various embodiments have been described primarily within the context of satellite broadcast communication networks, such as for television and radio broadcasts, other satellite-based networks not specifically involving the distribution of audio/video programming may benefit from application of the various concepts presented herein. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of communicating control information in a satellite broadcast communication system, the method comprising:
    transmitting at least one copy of a control message set from a control system by way of a satellite to a broadcast receiver, wherein the control message set comprises at least one control message;
    receiving at least one copy of each of the control messages of the control message set at the broadcast receiver;
    transmitting a feedback message from the broadcast receiver by way of a terrestrial communication link to the control system, wherein the feedback message comprises an indication that all of the control messages of the control message set were received at the broadcast receiver;
    receiving the feedback message at the control system;
    terminating transmission of subsequent copies of the control message set at the control system in response to receiving the feedback message;
    transmitting at least one copy of a second control message set from the control system by way of the satellite to the broadcast receiver, wherein the second control message set comprises multiple control messages;
    receiving less than all of the multiple control messages of the second control message set at the broadcast receiver within a predetermined time period of receiving at least one of the multiple control messages of the second control message set;
    transmitting a second feedback message from the broadcast receiver by way of the terrestrial communication link to the control system, wherein the second feedback message comprises an indication of those of the multiple control messages of the second control message set not received at the broadcast receiver;
    receiving the second feedback message at the control system; and
    transmitting at least one copy of at least those of the multiple control messages of the second control message set not received at the broadcast receiver from the control system by way of the satellite to the broadcast receiver in response to receiving the second feedback message.

2. The method of claim 1, wherein: the control message set comprises a single control message comprising an identifier for the single control message.

3. The method of claim 2, wherein: the indication in the feedback message comprises the identifier for the single control message.

4. The method of claim 1, wherein: the control message set comprises multiple control messages, wherein each of the control messages comprises an identifier for the associated control message and an indication of the other control messages of the control message set.

5. The method of claim 1, further comprising: terminating transmission of subsequent copies of those of the multiple control messages of the second control message set received at the broadcast receiver from the control system by way of the satellite in response to receiving the second feedback message.

6. The method of claim 1, wherein: transmitting the at least one copy of the control message set comprises transmitting each copy according to a predetermined transmission schedule; the feedback message comprises at least one timestamp indicating when each of the control messages of the control message set was received at the broadcast receiver; and the method further comprises modifying the predetermined transmission schedule based on the at least one timestamp.

7. The method of claim 1, wherein: the feedback message comprises at least one timestamp indicating when each of the control messages of the control message set was received at the broadcast receiver; and the method further comprises generating metrics based on the at least one timestamp, wherein the metrics indicate communication performance between the control system and the broadcast receiver.

8. The method of claim 1, further comprising: transmitting at least one copy of a second control message set from the control system by way of the satellite to the broadcast receiver, wherein the second control message set comprises at least one control message; and generating an error condition in the control system if a second feedback message associated with the second control message set is not received at the control system within a predetermined period of time of the transmission of the at least one copy of the second control message set.

9. The method of claim 1, wherein: the control message set comprises information for controlling access by the broadcast receiver to broadcast communications transmitted by way of the satellite.

10. A control system for a satellite broadcast communication system, the control system comprising:
a satellite communication interface configured to transmit control messages to broadcast receivers by way of a satellite, wherein each of the control messages comprises an identifier for one of the broadcast receivers intended to receive the control message;
a terrestrial communication interface configured to receive feedback messages from the broadcast receivers, wherein each of the feedback messages is associated with at least one of the control messages; and
control circuitry configured to:
generate a control message set comprising at least one control message intended for one of the broadcast receivers;
transmit at least one copy of the control message set by way of the satellite communication interface to the one of the broadcast receivers;
receive a feedback message associated with the control message set from the one of the broadcast receivers by way of the terrestrial communication interface, wherein the feedback message indicates that all of the control messages of the control message set were received at the one of the broadcast receivers;
terminate transmission of subsequent copies of the control message set in response to receiving the feedback message;
transmit at least one copy of a second control message set by way of the satellite communication interface to the one of the broadcast receivers, wherein the second control message set comprises multiple control messages, and wherein less than all of the multiple control messages of the second control message set are received at the one of the broadcast receivers within a predetermined time period of receiving at least one of the multiple control messages of the second control message set;
receive a second feedback message from the one of the broadcast receivers by way of the terrestrial communication interface, wherein the second feedback message comprises an indication of those of the multiple control messages of the second control message set not received at the one of the broadcast receivers; and
transmit at least one copy of at least those of the multiple control messages of the second control message set not received at the one of the broadcast receivers by way of the satellite communication interface to the one of the broadcast receivers in response to receiving the second feedback message.

11. The control system of claim 10, wherein: the control circuitry is further configured to encrypt each of the control messages of the control message set before transmitting the control messages of the control message set by way of the satellite communication interface to the one of the broadcast receivers.

12. The control system of claim 10, wherein: the control message set comprises multiple control messages, wherein each of the control messages of the control message set comprises an identifier for the control message and an indication of the other control messages of the control message set.

13. The control system of claim 10, further comprising: data storage; wherein feedback message comprises a first timestamp set indicating when each of the control messages of the control message set was received at the broadcast receiver; and wherein the control circuitry is further configured to store the first timestamp set from the feedback message, to store a second timestamp set indicating when each of the control messages of the control message set was transmitted, and to generate metrics based on the first timestamp set and the second timestamp set to indicate communication performance between the control system and the broadcast receiver.

14. A broadcast receiver for a satellite broadcast communication system, the broadcast receiver comprising:
a satellite communication interface configured to receive control messages from a control system by way of a satellite;
a terrestrial communication interface configured to transmit feedback messages to the control system; and
control circuitry configured to:
receive a control message set comprising at least one control message;
generate a feedback message associated with the control message set indicating that all of the control messages of the control message set were received;
transmit the feedback message by way of the terrestrial communication interface to the control system;
receive at least one copy of a second control message set from the control system by way of the satellite communication interface, wherein the second control message set comprises multiple control messages;
receive less than all of the multiple control messages of the second control message within a predetermined time period of receiving at least one of the multiple control messages of the second control message set;
transmit a second feedback message by way of the terrestrial communication interface to the control system, wherein the second feedback message is received at the control system and comprises an indication of those of the multiple control messages of the second control message set not received from the control system; and receive at least one copy of at least those of the multiple control messages of the second control message set not received from the control system by way of the satellite communication interface, the at least one copy transmitted from the control system in response to receiving of the second feedback message.

15. The broadcast receiver of claim 14, wherein: each of the control messages of the control message set indicates that the broadcast receiver is the intended destination of the control message set; and the control circuitry is configured to verify that each of the control messages of the control message set is intended for the broadcast receiver prior to transmitting the feedback message associated with the control message set by way of the terrestrial communication interface to the control system.

16. The broadcast receiver of claim 14, wherein: the control circuitry comprises a removable circuit card installed into an externally-accessible connector of the broadcast receiver.

\* \* \* \* \*